(12) United States Patent
Cui et al.

(10) Patent No.: US 6,399,940 B1
(45) Date of Patent: Jun. 4, 2002

(54) OPTICAL ROTARY POSITION ENCODER

(75) Inventors: Yifeng Cui, Fremont, CA (US); Hadi A. Akeel, Rochester Hills, MI (US); Michael A. McNeill, Hayward, CA (US)

(73) Assignee: Fanuc America Corporation, Hoffman Estates, IL (US)

( * ) Notice: Subject to any disclaimer, the term of this patent is extended or adjusted under 35 U.S.C. 154(b) by 0 days.

(21) Appl. No.: 09/309,398

(22) Filed: May 10, 1999

(51) Int. Cl.[7] .............................. G01D 5/34; H01J 3/14
(52) U.S. Cl. .......................... 250/231.13; 250/231.16; 250/237 G; 356/494
(58) Field of Search ...................... 250/231.13, 231.14, 250/231.16, 231.18, 237 G, 225, 237 R; 356/493, 494, 496, 498, 499

(56) References Cited

U.S. PATENT DOCUMENTS

| | | |
|---|---|---|
| 3,726,595 A | 4/1973 | Matsumoto |
| 4,629,886 A | 12/1986 | Akiyama et al. |
| 4,930,895 A | 6/1990 | Nishimura et al. |
| 4,967,072 A | 10/1990 | Nishimura et al. |
| 5,000,542 A | 3/1991 | Nishimura et al. |
| 5,036,192 A | 7/1991 | Ishizuka et al. |
| 5,101,102 A | 3/1992 | Nishimura et al. |
| 5,146,085 A * | 9/1992 | Ishizuka et al. ......... 250/237 G |
| 5,596,188 A | 1/1997 | McElroy |
| 5,596,403 A | 1/1997 | Schiff et al. |
| 5,652,426 A | 7/1997 | Maeda |
| 5,677,768 A | 10/1997 | Bockman |
| 5,783,752 A * | 7/1998 | Thorburn et al. ........... 356/493 |

OTHER PUBLICATIONS

A. Teimel, "Technology and Applications of Grating Interferometers in High–Precision Measurement", Precision Engineering vol. 14, No. 3, p. 147–154 (Jul. 1992).
Patent applied by Jeffrey A. Koch et al. 08/728,625; this patent application is entitled "Miniature Interferometric Rotary Encoder", Filed on Oct. 10, 1996.

* cited by examiner

*Primary Examiner*—Kevin Pyo
(74) *Attorney, Agent, or Firm*—James P. Hillman; Howard & Howard

(57) ABSTRACT

The present invention recognizes that the limiting structures to size reduction for an optical encoder were the laser diode/photo diode package and the photodetector with amplifier package(s). The invention includes removing the discrete components from the laser diode cover package and mounting the much smaller discrete components on a base framework. The photodetector with amplifier package of the invention have an altered photodetector/amplifier geometry including shortening the leads between them. This resulted in significant size reduction of the encoder, a reduction in required gain and resulting increase in bandwidth. The entire base framework is temperature cooled by disposing two thermo-electric coolers between the base framework and an adjacent heat sink. Such positioning of the two coolers between the base framework and it's adjacent heat sink stabilizes both the laser diode's and the photo detector's outputs. In addition this novel design stabilizes the entire footprint/base of the encoder from thermal effects, whatever their origin.

37 Claims, 7 Drawing Sheets

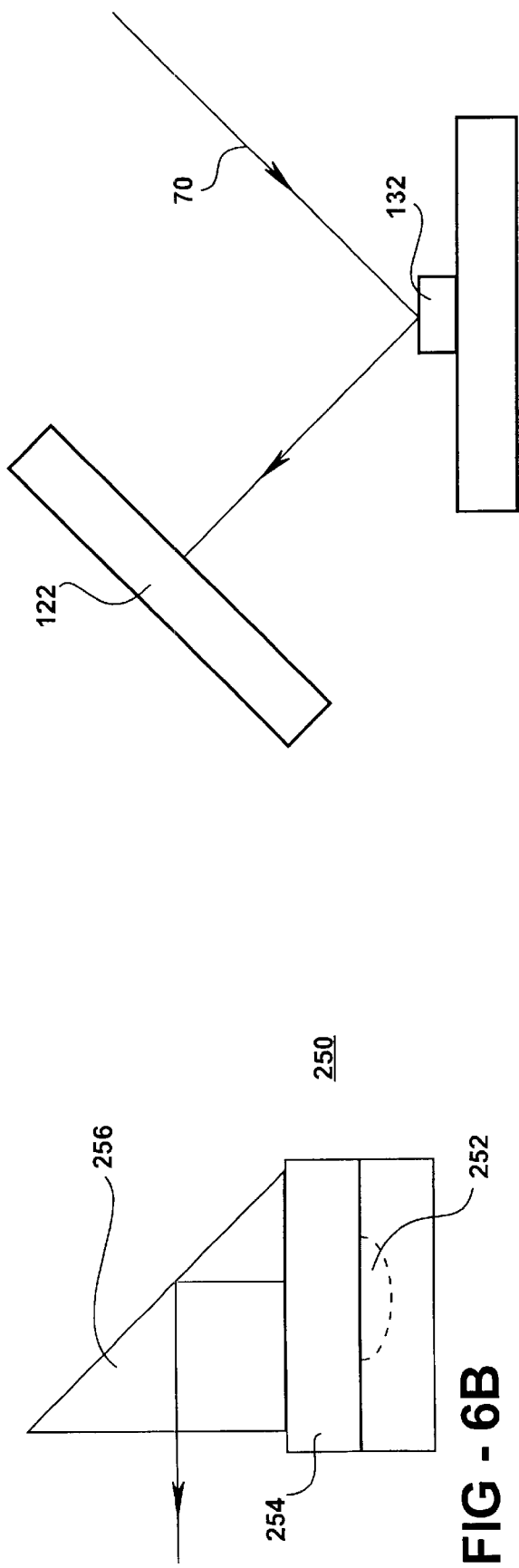

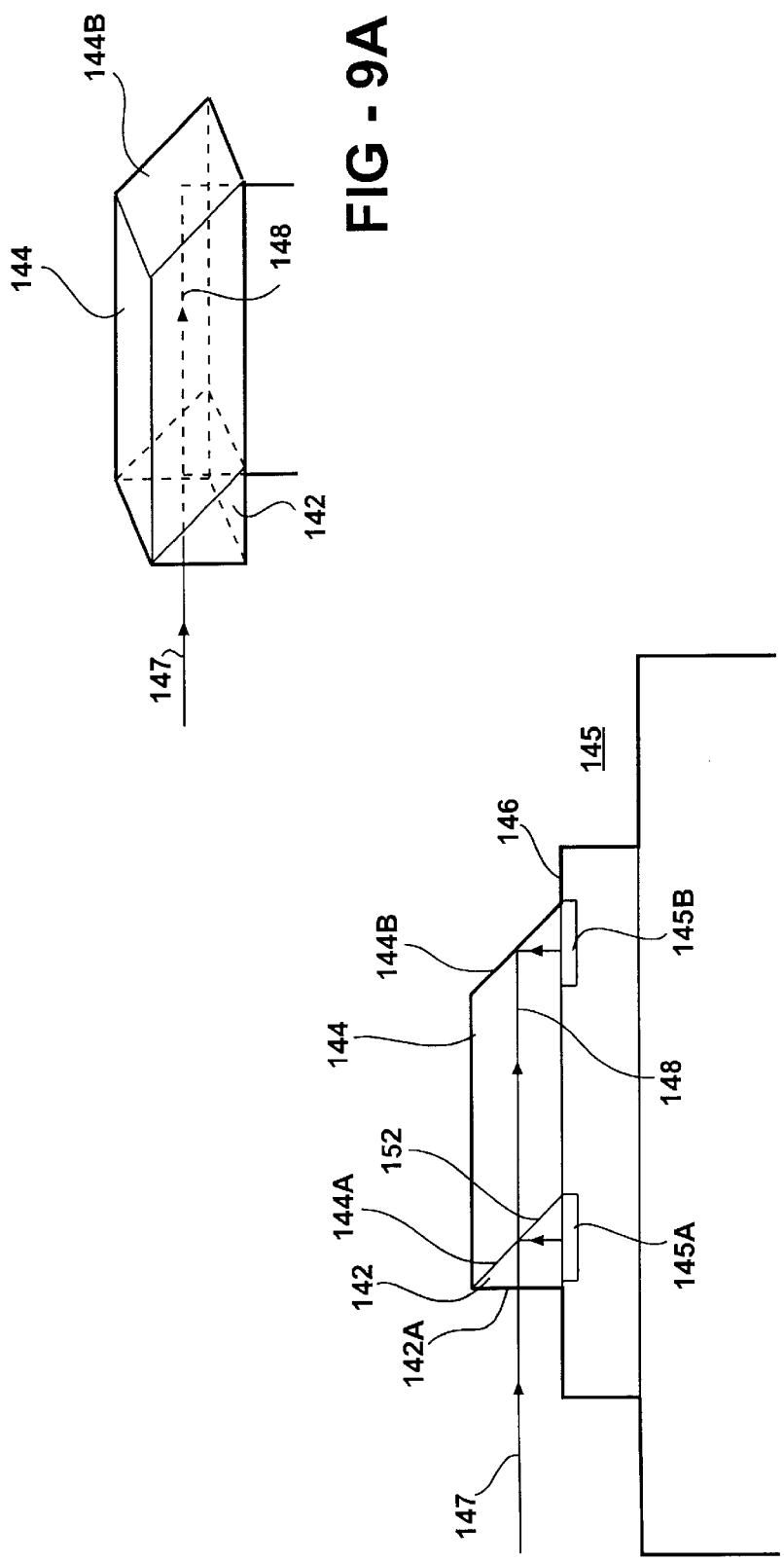

OPTICAL ROTARY POSITION ENCODER

BACKGROUND OF THE INVENTION

1. Field of the Invention

The invention relates in general to an optical rotary encoder and more specifically to a miniaturized optical encoder having an in situ laser beam generator, a novel heat dissipation system and a wave plate phase delay means.

2. Description of the Related Art

For some time now, optic encoder means have been used with great success for precise positioning applications. During this time it has been widely recognized by those skilled in the art that smaller is better. A smaller position tracking mechanism has obvious packaging and operational advantages such as for instance a smaller platform, increased beam intensity for diverging beam applications such as in the present invention, more responsive positioning system due to momentum reduction, reduced motor size requirements, etc. Limiting factors for farther size reduction are the physical size of the laser diode and photodetector packages, heat dissipation and optical component orientation and adjustment requirements.

Temperature parameter compensation is addressed in: U.S. Pat. No. 5,652,426 which is directed to an optical encoder that obtains displacement information by means of a twice-diffracted beam and a twice-transmitted beam to thereby compensate for changes of wavelength of a light beam due to temperature change.

Wave plate compensation is addressed in: U.S. Pat. No. 5,596,403 which is directed to an angular position measuring system having a source assembly including a laser driver, a conventional linear polarizer and a rotating half-wave plate. U.S. Pat. No. 5,677,768 discloses an encoder having a stationary and a rotating quarter-wave plate. A signal processor (for removing an unwanted component due to the rotating wave plate introducing a frequency shift proportional to the angular rotation) is mentioned but not described.

None of the above references addresses the temperature dissipation or wave plate orientation problems encountered when size reduction of optical encoders of the related art is attempted. Nor do the references address the problem that the physical size limitations of the laser diode and photo detector packages hampers further size reduction of optical encoder apparatus.

Accordingly it would be desirable to have a miniature optical encoder apparatus that is not limited by the size of the laser diode and photodetector packages. It would further be desirable if the miniature optical encoder apparatus included heat dissipation means for removing and dissipating heat from the entire apparatus. It would be further desirable if the miniature optical encoder apparatus included a combination of a wave plate phase delay means and signal processing means to provide for phase delay compensation/adjustment.

As has been mentioned earlier, the focus of this invention is to optimize and miniaturize the size of optical encoder apparatus. One of the necessary parameters that has to be addressed to miniaturize an optical encoder is of course heat control including most importantly heat dissipation. The invention recognizes that heat control plays an equally important role in optical encoders than as just a parameter to be controlled or optimized for miniaturization. For instance, uneven heating (including that due to uneven heat dissipation) anywhere in an optical encoder and especially in the base of the optical encoder can lead to degeneration of the optics due to uneven expansion or contraction of one or more elements and especially the base upon which the elements are mounted in the optical encoder apparatus, and degeneration of the epoxy attachment means for all of the encoder elements. In encoders of the Relevant Art, the heat generated by the laser diode is addressed because of course excess heat at the laser diode can interfere with its performance. For this reason, heat control mitigating elements are employed in typical laser diode packages. However, the present invention recognizes that heat comes from other sources besides the laser diode. Another heat source that has not been addressed by the Relevant Art is the heat that stems from the electric motor and drive shaft for movement of the rotary grating or other tracking means the optical encoder employs. Another source of heat is the ambient temperature of the environment in which the encoder is employed. Another source of heat are the electronic circuits that are both integral with and mounted on the optical encoder.

Accordingly, it would be desirable to have heat control apparatus that controls the heat profiles of the entire optical encoder architecture so that the laser diode performance is not affected, and that misalignment of the optics of the encoder will not result from heat induced material distortion. It would further be particularly desirable if the base mounting plate of the optical encoder were to be heat controlled so as to be operated in a heat range wherein laser diode output noise sources will be minimized.

SUMMARY OF THE INVENTION

Briefly the present invention recognizes that the limiting structures to size reduction for an optical encoder are the laser diode/photo diode package and the photodetector with amplifier packages. The invention includes removing the discrete components from the laser diode cover package and mounting the much smaller discrete components on a base framework. The photo detector with amplifier packages of the invention have an altered photodetector/amplifier geometry including reducing the length of the connection wire. This resulted in significant size reduction of the encoder, a reduction in required gain and resulting increase in bandwidth. The entire base framework is temperature cooled by disposing two thermoelectric coolers between the base framework and an adjacent heat sink. Such positioning of the two coolers between the base framework and it's adjacent heat sink maintains the base framework at a controlled temperature regimen so as to stabilize all elements(both optical and electronic) mounted on the base framework, most importantly stabilizing both the laser diode's and the photodetecto's outputs. In addition this novel design stabilizes the entire footprint/base of the encoder from thermal effects, whatever their origin. A preferred embodiment of the invention includes a combination of a wave plate and electronic tuning to adjust phase delay.

BRIEF DESCRIPTION OF THE DRAWINGS

The invention may be understood and further advantages and uses thereof more readily apparent, when considered in view of the following detailed description of the exemplary embodiments, taken with the accompanying drawings in which:

FIG. 6B is an elevational view of a vertical cavity surface emitting laser (vcsel) and a prism illustrating how polarization can be adjusted by rotating the vcsel relative to the prism;

FIG. 7 is a schematic view showing how the prism 64 with polarizing coating 65 can be eliminated by coating a polarizing film directly on photo detector 66 of FIG. 2, and FIG. 8 is a schematic view showing how a small detector eliminates the pin hole 42 of FIG. 2.

FIG. 9 is a schematic diagram illustrating how one photodetector with a two-element array and a rhombic prism combination can replace two photodetectors and prism combination all according to the teachings of the invention;

FIG. 9A is a three-dimensional view of the rhombic prism of FIG. 9;

DESCRIPTION OF THE PREFERRED EMBODIMENTS

Figure 1:
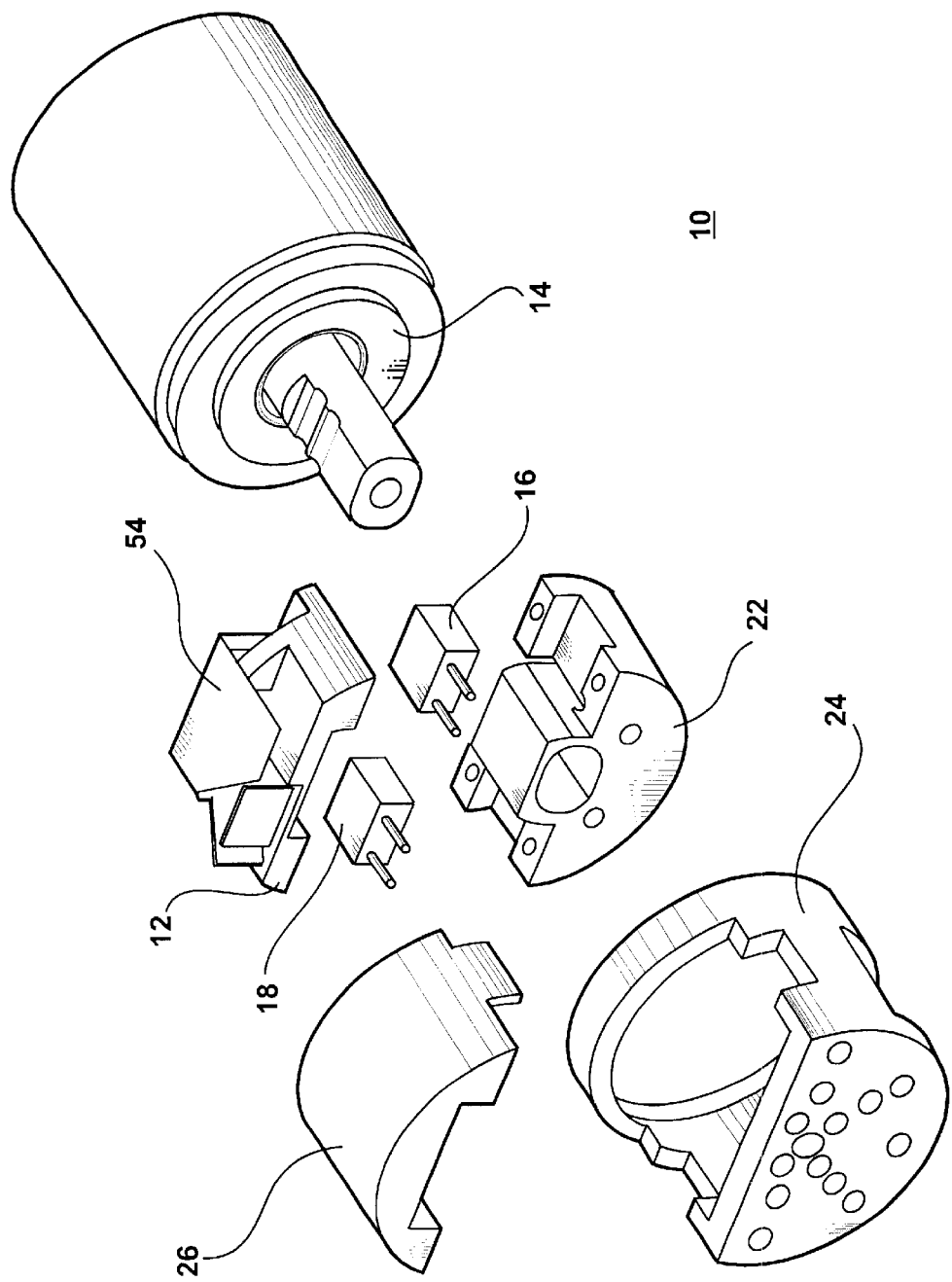
FIG. 1 is an exploded isometric view of the miniature interferometric optical encoder further illustrating the location and orientation of the discrete components.
Figure 2:
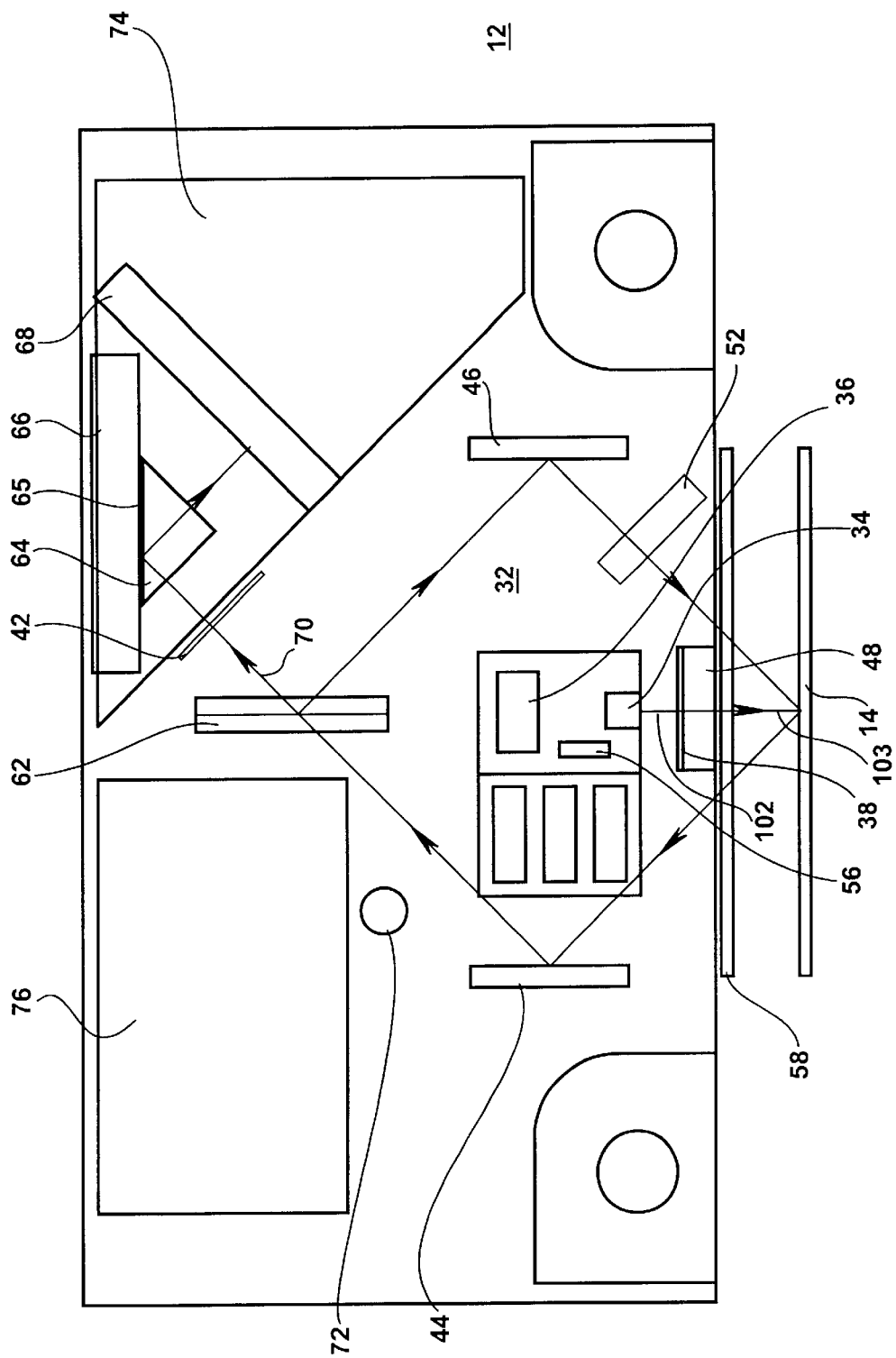
FIG. 2 is a plan view of the optics block of the miniature interferometric optical encoder illustrating the location and orientation of the discrete components and the light paths within the encoder in operation.

Referring now to the drawings and to FIGS. 1, and 2 in particular, there are shown an isometric view and a plan view of the miniature interferometric optical encoder 10, constructed according to the teachings of the invention. Optical encoder unit 10 includes encoder optics block 12, rotary grating 14, first and second thermo-electric (TE) coolers 16 and 18, heat sink 22, end cover 24, and cap 26. Encoder optics block 12 includes and has disposed thereon laser diode module 32 which includes laser diode chip source 34 and photo diode 36. Encoder optics block 12 further includes and has disposed thereon first and second pinholes 38 and 42, first and second mirrors 44 and 46, first and second wave plates 48 and 52, first light shield 54 (FIG. 1) and second and third lightshields 56, 58 (FIG. 2), beam splitter plate 62, polarizing coated prism 64 and first and second photodetectors with amplifiers 66 and 68. Encoder optics block 12 further includes and has disposed thereon temperature sensor 72 for regulating thermo-electric coolers 16 and 18, a printed circuit board (PCB) 74 dedicated to the photodetector amplifiers 66 and 68 respectively and a miscellaneous component wiring printed circuit board (PCB) 76. Thermal electric coolers 16, 18 respectively, operate to transfer heat in either direction between optics block 12 and heat sink 22, to provide for regulating and stabilizing the temperature of optics block 12.

Figure 3:
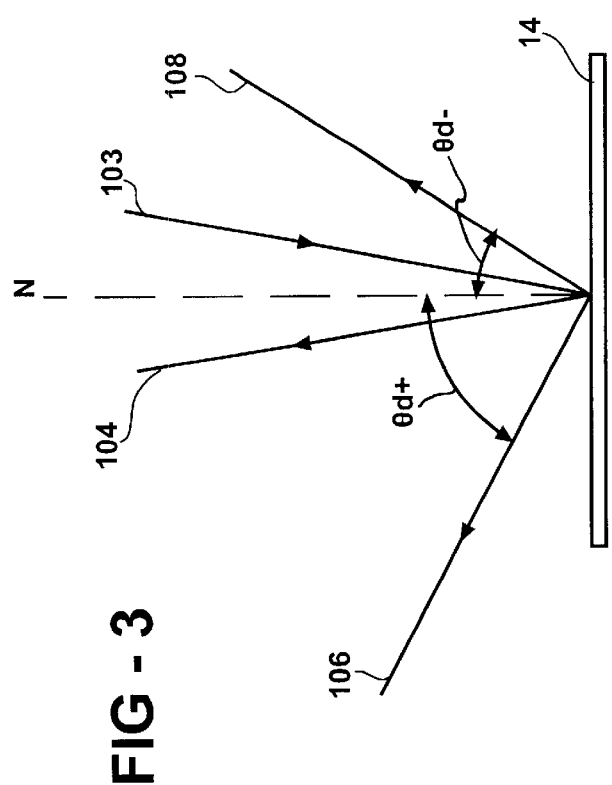
FIG. 3 is a schematic view of the grating and the way the grating diffracts the incident laser beam into multiple beams of differing order according to the teachings of the invention.

Referring now to FIGS. 2 and 3, there are illustrated the operating principles of the miniature grating interferometric rotary encoder 10, constructed according to the teachings of the invention. Referring now in particular to FIG. 2, in operation, the horizontally polarized light output 102 from laser diode chip source 34 passes through pinhole 38, light shield 58 and quarter wave plate 48, by which time the horizontally polarized light output 102 then becomes near circularly polarized. At this stage, the laser light polarization cannot be all along or perpendicular to the grating groove directions but rather must be partially along or perpendicular to the grating groove directions. This is essential in order to get two phase delayed optical outputs. Theoretically any other polarization direction will work, but in order to generate two equal amplitude outputs, it is preferred to use either a circularly polarized or linearly polarized direction with 45° orientation. Referring now in particular to FIG. 3, the surface normal reference line is shown at N, the spatially and temporally coherent circularly polarized light 103 illuminates reflective radial grating 14. The grating 14 diffracts the incident laser beam into one pair of beams of first order 106 and 108, and possibly other beams of higher order depending on wavelength and grating constant. The zeroth order beam 104 is reflected back and mostly blocked by the pinhole 38 due to the divergence of the beam.

The diffraction angle $\theta_d$ relative to the surface normal reference line N is given by $$\sin\theta_d = \sin\theta_{in} + m\lambda/d$$

where, m is the diffraction order number, $\theta_{in}$ is the angle of the incident laser beam with respect to the surface normal reference line N of the grating surface, $\lambda$ is the laser wavelength, and d is the grating constant. If d is small enough ($d<2\lambda$), only orders with m=−1 and m=+1 are diffracted, producing two diffracted beams 106 and 108, at angles $\theta=\theta_{-1}$ and $\theta=\theta_{+1}$, respectively. In our case, $\theta_{in}=0°$, d =0.95 $\mu$m, and $\theta_d=+45°$. All diffracted beams are mutually coherent both spatially and temporally and have different phase changes upon diffraction. They are able to interfere with one another once they are overlapped along the same direction. When the grating (14) moves along the direction of the arrow for a distance d within certain time interval t, the phase difference $\phi$ between beams 106 and 108 is modulated by the grating motion, $$\phi(t)=\omega t=2\pi d/\lambda(\sin\theta_{+1}-\sin_{-1}\theta_{-1}).$$

Therefore the grating movement modulates the phase variation of the two beams and thereby produces moving interference patterns. In order to produce interference effects, the two diffracted beams, 106 and 108, must be recombined. This is accomplished by the two mirrors 44, 46 (FIG. 2) respectively, and by beam splitter plate 62 that partially transmits and partially reflects incident light beams 106 and 108 respectively. The interference occurs when the two beams 106 and 108 are recombined at beam splitter plate 62 whereby the two beams 106 and 108 are made to be as collinear as possible. The interference fringe separation L depends on the angle $\delta$ between the two overlapped beams which is given by $$L=\lambda/2\sin(\delta/2).$$

A small area of the interference fringe on one side of the beam splitter plate transmits through pinhole 42. A polarizing prism 64 having a polarizing coating on the diagonal side 65 transmits light polarized in a first predetermined direction and reflects light polarized in a second predetermined direction and thereby splits the recombined beam into first and second orthogonal polarized beams. First and second photodetectors 66 and 68, each having their own built in amplifiers intercept the first and second orthogonal polarized beams respectfully and convert the optical signals into voltage signals suitable for counting and other electronic processing.

Figure 4:
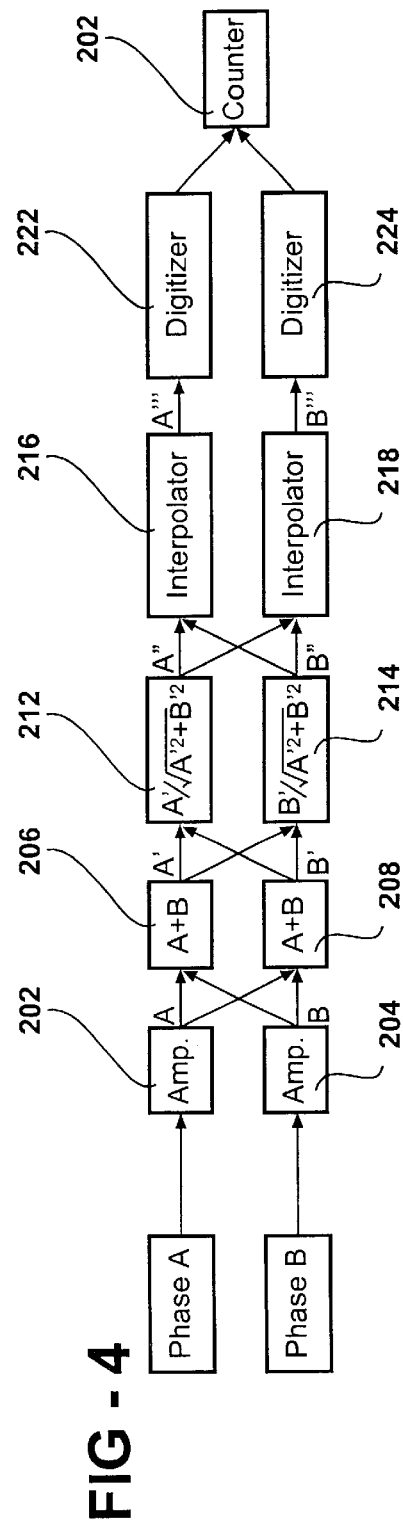
FIG. 4 is a block diagram of the encoder electronics and the interconnections with the output of the encoder unit operating components.

The electronic processing of the invention is set forth with reference to FIGS. 4 and 5 wherein there are illustrated a block diagram of the encoder electronics and the interconnections with the output of the encoder unit operating components and a schematic diagram of the A+B; A−B phase tuning circuit. Referring to FIG. 4, the phase A and phase B blocks are the raw signals from detectors 66 and 68 of encoder 10. These encoder raw signals are then amplified through two amplifier blocks 202, 204, with output A and B. Outputs A and B are then fed into A+B, A−B circuit blocks 206, 208 which generate output A' and B' with exact 90° degree phase difference. The normalization circuit blocks 212, 214 generate stable A" and B" signals which are independent of the input signal variations. Signals A" and B" are then fed into interpolation stage 216, 218 which generate interpolated high resolution signals A''' and B'''. Signals A''' and B''' are then fed into digitizer blocks 222, 224 respectively, and are then fed into the display counter block 226.

The purpose and function of the second waveplate 52 is to bring the phase delay between signals A and B as close to 90 as feasible with a wave plate. This phase delay adjustment by the second waveplate 52 is important because the A+B, A−B circuits 206, 208 respectfully, (which generate output A' and B' with exact 90° degree phase difference) will not work properly, that is they will not be able to compensate when the initial phase difference between signals A and B is small (such as when the phase difference approximates 0° or 180°). The reason for this difficulty in compensation by the A+B, A−B circuits 206, 208 respectfully, is that the DC offsets of A+B will be much larger (or much smaller depending on the phase difference) than that of A−B or A−k*B, thus one channel might need tremendous gain to bring the two signals A' and B' equal. But in all practicality, an amplification circuit can only provide gain to a certain reasonable extent. In addition to the high gain problem there is a noise problem associated with high gain; one channel (that requiring high gain) will be much noisier than the other channel. Therefore the circuit will not work properly when the input signals' phase difference is so small such that the amplification circuit cannot provide enough gain. The invention therefore adds waveplate 52 in one beam path to change the phase difference between the signals A and B closer to 90°. There is no stringent requirement on the wave plate orientation as long as the phase difference is small such that the circuit can provide enough gain to approximate 90° phase difference with an acceptable signal/noise ratio. By combining the waveplate 52 and the phase tuning circuits 206, 208 respectively, the invention teaches a simple method and the required apparatus to get 90° phase delayed signals.

Figure 5:
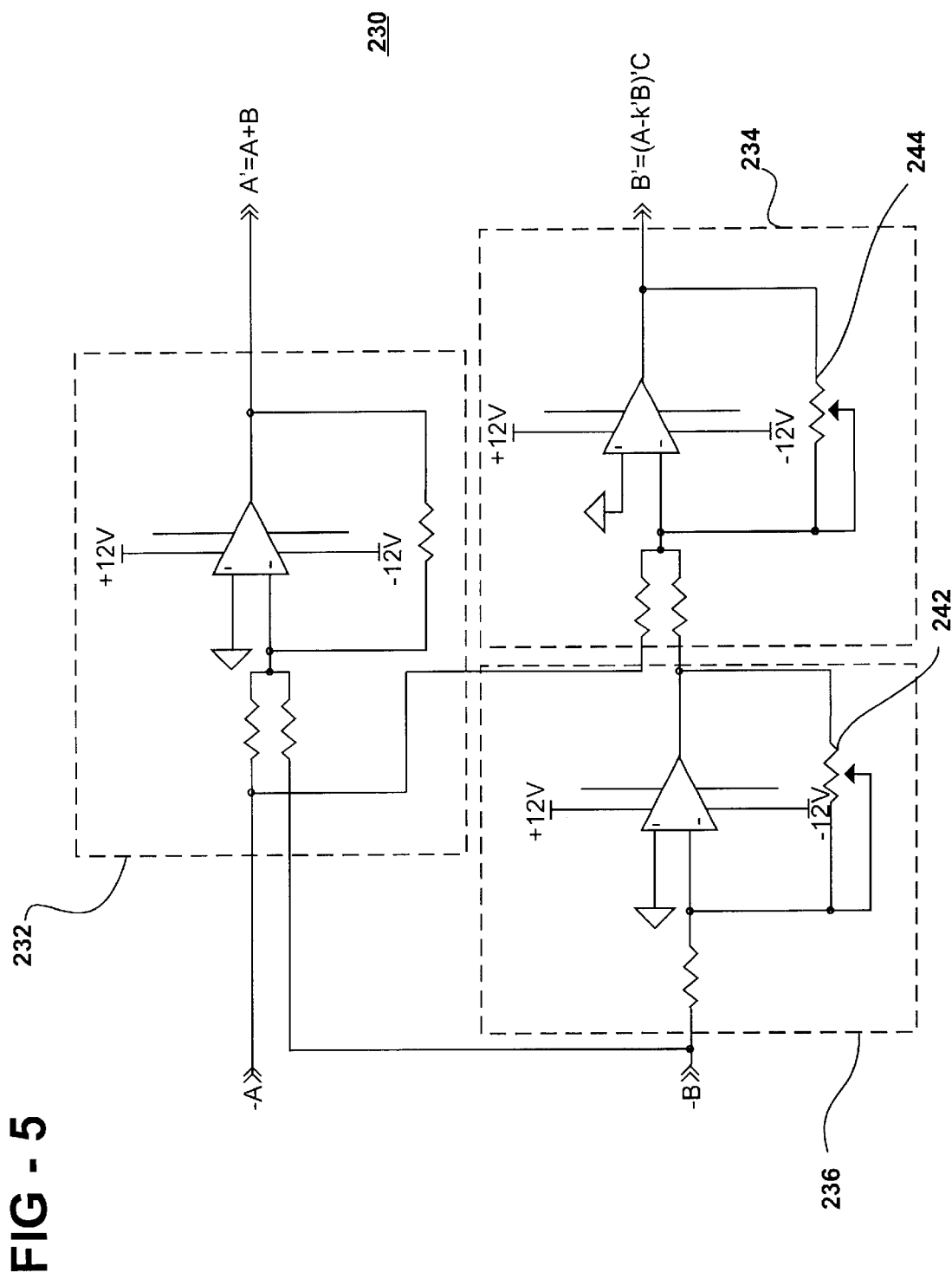
FIG. 5 is a schematic diagram of the A+B; A−B phase tuning circuit.

Referring now to FIG. 5, there is shown a schematic diagram of phase tuning circuit 230, including three operational amplifiers (e.g. OP27) shown at adder blocks 232, 234 respectively, and inverter with gain block 236 which are interconnected as shown to provide A+B and A−k*B functions.

When the two channels A and B have the same amplitudes $A_0$ but non-90° phase difference, a method of combining A and B to generate A'=A+B and B'=A−B can be used. This can be expressed as:

$A'=A_0 \sin(\theta+\delta)+A_0 \sin \theta$ $=A_0 \sin(_{74 +\delta}/2)\cos(\delta/2)\alpha\sin(\theta+\delta/2)$ $B'=A_0 \sin(\theta+\delta)−A_0 \sin\theta$ $=A_0 \cos(\theta+\delta/2)\sin(\delta/2)\alpha\cos(\theta+\delta/2)$ where $\theta$ is the overall phase angle of one channel, and $\delta$ is the phase angle difference between the two channels. The new outputs A' and B' have exactly 90° phase difference. But this method does not apply to cases where the amplitudes of A and B are not equal, $A_0 \neq B_0$, which is common in real applications. We add a gain factor k in one of the channels, e.g. B'=A−k*B instead of A−B, to expand the phase tuning range of this circuit.

$A'=A_0 \sin(\theta+\delta)+B_0 \sin \theta$ $B'=A_0 \sin(\theta+\delta)−k*B_0 \sin \theta$ In this way the circuit can handle with non-90° phase difference and unequal amplitudes. By adjusting the gain factor k, the phase difference between A' and B' can be easily tuned to 90°. Referring now to FIG. 5, the gain factor k is adjusted by varying the POT R8 shown at 242, which may for example be a 20K variable resister. POT R7 shown at 244, which may for example be a 50K variable resister, is adjusted to match the channel B' output level with that of channel A'.

Assembly: The assembly procedure is mount or assemble the discreet encoder components on encoder cold block 12 in the following order: First the laser diode module 32 and mirrors 44,46 are mounted on encoder optics/cold block 12. Second, mount beam splitter plate 62 without fixing its position. Third, assemble first and second thermoelectric coolers 16, 18 respectively and radial grating 14 on he at sink 22, and attach the heat sink 22 to encoder optics/cold block 12 with the thermoelectric coolers 16, 18 disposed there between. Forth, adjust encoder optics/cold block 12's position relative to heat sink 22 and attached radial grating 14 while monitoring the interference pattern of recombined beam 70 until a good pattern is observed. The fifth and final assembly step is to fine tune the beam splitter plate 62's angular position to get closer to the center of the interference pattern i.e. to provide the largest interference pattern.

The machined encoder optics/cold block 12 and heat sink 22 have high enough accuracy to provide an accurate alignment structure for the encoder constructed according to the teachings of the invention. The accuracy of the typical CNC machine is about a few micrometers and angular accuracy is about 1 milli-radians for current encoder size. The alignment tolerance required for a grating interferometer using a collimated laser beam can be estimated to be $$\delta < \lambda/D$$

where $\delta$ is the angle that produces the interference pattern spacing D. This equation was developed in patent application Ser. No. 08/728,625, entitled "MINIATURE INTERFEROMETRIC ROTARY ENCODER" assigned to the same assignee as the present invention, which is hereby referred to and incorporated herein. This equation gives an estimate on the angular alignment error tolerance. For the laser wavelength of $\mu$=0.67 $\mu$m and D=1 mm, the interfering beams must be co-linear to a precision <0.67 mill-radians. Based on the CNC machined structure and fine tuning of the beam splitter plate 62, plus the beam divergence, all the errors generated when the laser diode module 32 and mirrors 44, 46 are mounted on encoder optics/cold block 12 can be compensated for by fine tuning the beam splitter plate 62. This is an advantage over the related art in that this mounting procedure dispenses with the necessity for accurate mounting tolerances during the assembly process when the laser diode module 32 and mirrors 44, 46 are mounted on encoder optics/cold block 12.

What has been disclosed and described then is the ability to put the laser diode chip source 34 for generating a beam of light directly on the optical encoder means rather than bringing the light source in by means of a fiber optic cable. This was accomplished by using a chip for the laser diode module 32 directly, including both the laser diode chip source 34 and the photo diode 36, without a conventional surrounding enclosure. The overall size and in particular the footprint of optics/cold block 12 was reduced significantly. Furthermore, disposing photo diode 36 at 110° to the laser diode chip source 34's output axis reduces reflection light to the laser diode chip 36.

Figure 6A:
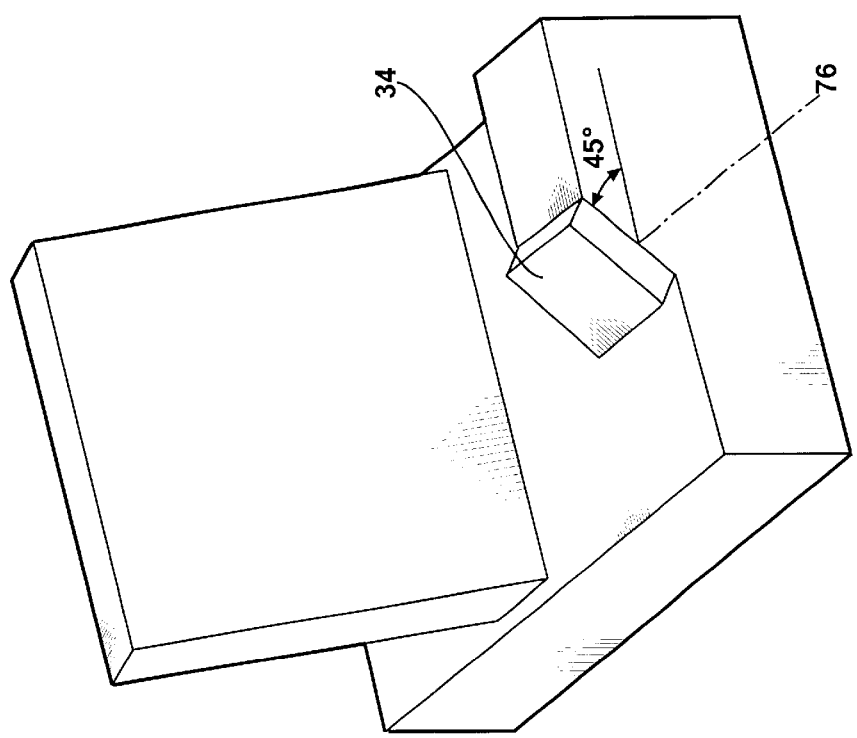
FIG. 6A is another embodiment of the laser diode mounting block.
Figure 6:
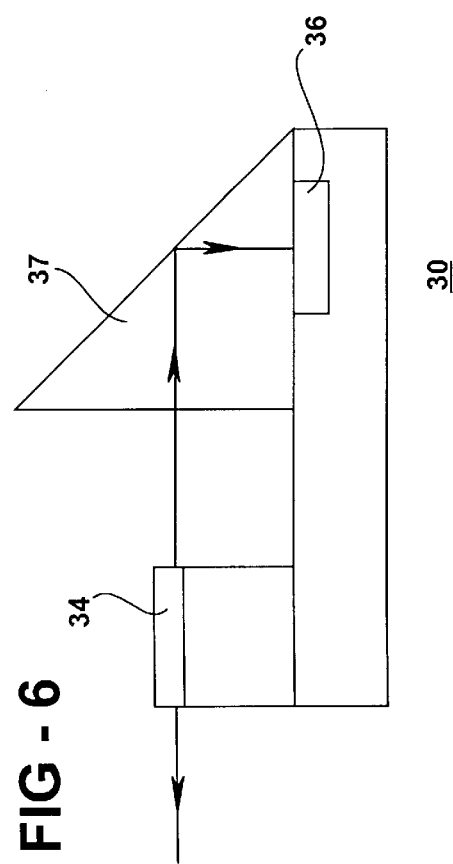
FIG. 6 is another embodiment of the laser diode mounting block.

The size of the laser diode module 32 may be further reduced by integrating the laser diode 34 and the photo diode 36 on one chip module 30 as shown in FIG. 6 with approximate sizes of ½ millimeter wide by less than one millimeter long. This can reduce the encoder's length, width and height because the laser diode 34 and the photo diode 36 are the limiting factors for the size of the encoder when they are installed insitu according to the teachings of the invention. The electrical leads for laser module chip 30 may be disposed through chip 30 by standard chip fabrication. Prism 37 is used to couple lazer diode 34's output to photo detector 36.

Additional embodiments of the invention include the elimination of quarter wave plate 48. The purpose of quarter wave plate 48 is to generate a circular beam of polarized light before it reaches and strikes grating 14. This can also be accomplished by using a linearly polarized light with polarization oriented along and at 45° relative to the groove direction of grating 14. This can be accomplished by a 45° rotation of laser chip 34 along laser output axis 76 as shown in FIGS. 6 and 6A.

Another embodiment to replace laser diode 34 and photodiode 36 of FIG. 2 is shown in FIG. 6B. Referring now to FIG. 6B, laser module 250 includes photodiode 252, laser (VCSEL) diode 254, and prism 256. The laser polarization state can be adjusted by rotating the VCSEL laser diode 254 relative to prism 256, thereby providing a readily adjusted polarization state in a compact laser diode module 250.

Referring now to FIG. 7 there is shown how the prism 64 with polarizing coating 65 can be eliminated by coating a polarizing film directly on photo detector 66 (FIG. 3) with a suitable polarizing coating film. Incident light beam 70 has two phase delayed optical components of light, P & S. Photo detector 114 has a polarizing coating 110 which transmits the P component of light into photo detector 114 and reflects the S component of light 118 over to photo detector 122. Photo detector 122 then has anti-reflection coating 124 transmitting S component of light into photo detector 122. In this manner, photo detector 114 detects and generates a voltage output for P component of incident beam 70 and photo detector 122 gives a voltage output relative to S component of incident light beam 70. This will eliminate prism 64 while still detecting both phase delayed optical components of incident light beam 70. This will reduce the number of optical components inside and mounted on optic block 12.

Referring now to FIG. 8, there is shown another embodiment of photo detector 114 of FIG. 7 wherein now polarized coating 110 of FIG. 7 is now replaced by small area detector 132 disposed on a support. This small area detector 132 functions as a pinhole and detector to detect the P polarization component and reflects the S component of incident beam 70 over to photo detector 122. Detector 132 then combines three functions (pinhole, polarization detector, polarization reflector) of pinhole 42, prism 64 and photodetector 66 (see FIG. 2). In this maimer, pinhole 42 and prism 64 (FIG. 2) can be eliminated and again optics/cold block 12 will have fewer components to be mounted.

Referring now to FIGS. 9 and 9A, there is shown photo detector 145 having a two element array 145a and 145b respectively, with built-in amplifiers. Due to the limitations of the wire bonding configurations, it is preferable to bond the photodetector chips in one plane. That is why both elements 145a and 145b are shown disposed in the same plane 146. There is also shown on top of plane 146 disposed a right angle prism 142 having black painted coating 142A defining opening 142 or an additional pinhole (not shown) and rhombic prisms 144 having a polarizing coating 152 on one face 144A. Polarized laser beam 147 will be reflected by the polarizing coating 152 to one photo detector 145A and the other polarization beam 148 will transmit through this small coated area 152 of face 144A and be totally internally reflected at face 144B of the prism to the second photo detector 145B. This combination will eliminate one photo detector, one prism, and one pinhole from having to be mounted on encoder optics/cold block 12. Right angle prism 142 and rhombic prism 144 must be made of the same material to prevent diffraction of the light polarized beam 147.

We claim:

1. An optical encoder having an in situ laser beam generator, comprising:

a) a laser source for generating a laser beam of light;

b) diffracting means disposed on a first side of said laser source for diffracting said incident laser beam into first and second diffracted beams of first order having a predetermined angle of separation between them;

c) first and second reflecting means disposed on second and third sides of said laser source respectfully for reflecting each of said first and second diffracted beams around said laser source to a common point of incidence at a fourth side of said laser source opposite said first side to provide an optical encoder having an in situ laser beam generator;

d) combining means disposed at said point of incidence at said fourth side for recombining said first and second diffracted beams to provide two interfering overlapped beams (of first order) having a predetermined interference fringe separation;

e) a base frame of heat conducting material for mounting and supporting some optical encoder elements in the same plane on a first side of said base frame; and f) a heat sink of heat conducting material disposed in spaced relationship with a second opposite side of said base frame for acting as a heat repository.

2. The optical encoder of claim 1, wherein claim element (a), a laser source for generating a laser beam of light, includes a laser diode and a feedback photo diode integrated on a chip mount.

3. The optical encoder of claim 2, wherein said feedback photo diode is mounted first on the chip mount and the laser diode chip is disposed on the top side of the photo diode opposite said chip mount.

4. The optical encoder of claim 3, wherein said laser diode chip has a top and a bottom side, said bottom side being disposed on top of said photo diode opposite said chip mounting of said photo diode and wherein a prism is disposed on the top side of said laser diode chip to bend the output light beam at a 90° angle so as to be directed toward said diffracting means.

5. The optical encoder of claim 1, wherein said diffracting means includes a grating having grooves disposed in a predetermined direction and wherein said laser source generates a laser beam of light polarization oriented 45° relative to said grating groove direction.

6. The optical encoder of claim 5, wherein claim element (a), a laser source for generating a laser beam of light, includes a laser diode and a feedback photo diode.

7. The optical encoder of claim 6, wherein the diffracting means includes a grating having grooves disposed thereon in a predetermined direction, and wherein claim element (a), a laser source generating a laser beam of light, generates said laser beam of light along a laser output axis and wherein said laser source is disposed on a plane that is rotated 45° relative to said grating groove direction along said laser output axis such that said laser output is polarized 45° relative to said grating groove direction.

8. The optical encoder of claim 7 wherein the laser source is disposed on a laser mounting block, said laser mounting block having a laser source mounting surface disposed at a 45° angle to the horizontal along said laser output axis and a feedback photo diode mounting surface disposed at approximately 110° angle to said laser output axis.

9. The optical encoder of claim 1, further including a pinhole and a prism for directing said interfering overlapped beams at first and second photo detectors.

10. The optical encoder of claim 1, further including first and second photo detectors, said first photo detector disposed so as to receive said first and second interfering overlapped diffracted beams of differing orders having a predetermined interference fringe separation, and said second photo detector disposed at a 45° angle relative to said first photo detector, said first photo detector having a polarizing coating disposed on its incident face for receiving one of said first and second diffracted interfering beams into said first photo detector and for reflecting the other of said first and second diffracted beams over to said second photo detector, each of said first and second photo detectors generating an output voltage representative of said first and second diffracted beams.

11. The optical encoder of claim 10, wherein said first photo detector is a very small incidence area detector which acts as a pinhole for receiving one of said first and second diffracted beams and for transmitting the other of said first and second diffracted beams over to said second photo detector to provide for eliminating a separate pinhole on the incident side of said first photo detector.

12. The optical encoder of claim 11, further including first and second photo detector means each disposed in the same orientation on one plane and a rhombic prism having first and second faces and wherein the first and second interfering overlapped diffracted beams are separated by means of said rhombic prism having a polarizing coating means on said first face disposed in a small area on said first face that acts as a pinhole and a reflecting means disposed on said second face, one of the first and second interfering overlapped diffracted beams being reflected by this small coated area to one of said first and second photo detectors and the other polarization beam will be transmitted through this first face and totally reflected at the second face of the rhombic prism to the second photo detector because said second face is disposed at least at a greater than critical angle to provide for total internal reflection of said second diffracted beam over to said second photo detector.

13. The optical encoder of claim 12, further including a second prism disposed contiguous with the first face of the rhombic prism, said second prism being made of the same material the rhombic prism is made of to prevent refraction of said transmitted interfering overlapped diffracted beams.

14. The optical encoder of claim 10 further including a prism for directing said interfering overlapped beams at said first and second photo detectors wherein said prism has a polarizing coating disposed on a face disposed contiguous with said first photodetector to provide for receiving one of said first and second diffracted interfering beams into said first photo detector and for reflecting the other of said first and second diffracted beams over to said second photo detector.

15. The optical encoder of claim 10, wherein said first photo detector includes a very small incidence area coating which acts as a pinhole for receiving one of said first and second diffracted beams and for transmitting the other of said first and second diffracted beams over to said second photo detector to provide for eliminating a separate pinhole on the incident side of said first photo detector.

16. The optical encoder of claim 1 wherein claim element d) combining means disposed at said point of incidence at said fourth side for recombining said first and second diffracted beams to provide two interfering overlapped beams transmits one of said first and second diffracted beams and reflects the other of said first and second diffracted beams to provide for making said beams as collinear as possible and thereby maximize said interference fringe.

17. The optical encoder of claim 1, further including a waveplate disposed between the laser source and the combining means to provide a coarse phase delay between the first (signal A) and second (signal B) diffracted beams as close to 90° as feasible with a wave plate.

18. The optical encoder of claim 17, further including phase compensation electronic tuning circuits A+B, A−B respectfully, to provide fine phase delay between the first (signal A) and second (signal B) diffracted beams as close to 90° as feasible with an electronic tuning circuit.

19. The optical encoder of claim 18, wherein the laser source includes a vertical cavity surface emitting laser (vcsel) and a prism to provide for polarization adjustment by rotating the vcsel relative to the prism.

20. The optical encoder of claim 1 further including
   g) heat pump means disposed between said base frame and said heat sink for actively transferring heat in and out of said base frame said heat sink to provide for stabilizing both the laser source and the entire base frame of the encoder from thermal effects, whatever their origin.

21. An optical encoder having an in situ laser beam generator, comprising:
   a) a laser source for generating a laser beam of light;
   b) diffracting means disposed on a first side of said laser source for diffracting said incident laser beam into first and second diffracted beams of first order having a predetermined angle of separation between them;
   c) first and second reflecting means disposed on second and third sides of said laser source respectfully for reflecting each of said first and second diffracted beams around said laser source to a common point of incidence at a fourth side of said laser source opposite said first side to provide an optical encoder having an in situ laser beam generator;
   d) combining means disposed at said point of incidence at said fourth side for recombining said first and second diffracted beams to provide two interfering overlapped beams (of first order) having a predetermined interference fringe separation;
   e) a base frame of heat conducting material for mounting and supporting some optical encoder elements in the same plane on a first side of said base frame;
   f) a heat sink of heat conducting material disposed in spaced relationship with a second opposite side of said base frame for acting as a heat repository; and g) heat pump means disposed between said base frame and said heat sink for actively transferring heat in and out of said base frame and said heat sink to provide for stabilizing both the laser source and the entire base frame of the encoder from thermal effects, whatever their origin.

22. The optical encoder of claim 21, further including a waveplate disposed between the laser source and the combining means to provide a coarse phase delay between the first (signal A) and second (signal B) diffracted beams as close to 90° as feasible with a wave plate, and phase compensation electronic tuning circuits A+B, A−B respectfully, to provide fine phase delay between the first (signal A) and second (signal B) diffracted beams as close to 90° as feasible with an electronic tuning circuit.

23. The optical encoder of claim 21, wherein the laser source includes a vertical cavity surface emitting laser (vcsel) and a prism to provide for polarization adjustment by rotating the vcsel relative to the prism.

24. A method of assembling an optical encoder having an in situ laser beam generator, including:
   a) a laser source for generating a laser beam of light;
   b) diffracting means disposed on a first side of said laser source for diffracting said incident laser beam into first (signal A) and second (signal B) diffracted beams of first order having a predetermined angle of separation between them;
   c) combining means disposed at said point of incidence at said fourth side for recombining said first and second diffracted beams to provide two interfering overlapped beams (of first order) having a predetermined interference fringe separation; comprising the steps of disposing a waveplate between the laser source and the combining means and adjusting said waveplate to provide a coarse phase delay of approximately 90° between the first (signal A) and second (signal B) diffracted beams, and then electronically tuning phase compensation circuits A+B, A−B respectfully, to provide fine phase delay between the first (signal A) and second (signal B) diffracted beams to as close to 90° as feasible with an electronic tuning circuit.

25. An optical encoder having an in situ laser beam generator, comprising:
   a) a laser source for generating a laser beam of light;
   b) diffracting means disposed on a first side of said laser source for diffracting said incident laser beam into first and second diffracted beams of first order having a predetermined angle of separation between them, wherein each of said first and second diffracted beams has an amplitude;
   c) first and second reflecting means disposed on second and third sides of said laser source respectfully for reflecting each of said first and second diffracted beams around said laser source to a common point of incidence at a fourth side of said laser source opposite said first side to provide an optical encoder having an in situ laser beam generator; and amplitude equalizing means disposed between said laser source and said diffracting means for equalizing the amplitudes of said first and second diffracted beams.

26. The optical encoder of claim 25 wherein said diffracting means includes a grating having grooves disposed in a predetermined direction.

27. The optical encoder of claim 26 wherein said amplitude equalizing means is further defined as a quarter wave plate disposed between said laser source and said grating for equalizing the amplitudes of said first and second diffracted beams.

28. The optical encoder of claim 26 wherein said laser source generates said laser beam of light polarization oriented 45° relative to said grating groove direction.

29. The optical encoder of claim 28 wherein said laser source generates said laser beam of light along a laser output axis and wherein said laser source is disposed on a plane that is rotated 45° relative to said grating groove direction along said laser output axis such that said laser output is polarized 45° relative to said grating groove direction.

30. The optical encoder of claim 29 further including a laser mounting block for supporting said laser source.

31. The optical encoder of claim 30 wherein said amplitude equalizing means is further defined as a laser source mounting surface of said laser mounting block wherein said laser source mounting surface is disposed at a 45° angle to the horizontal along said laser output axis.

32. The optical encoder of claim 31, wherein claim element (a), a laser source for generating a laser beam of light, includes a laser diode and a feedback photo diode.

33. The optical encoder of claim 32 further including a feedback photo diode mounting surface for supporting said feedback photo diode wherein said feedback photo diode mounting surface is disposed at approximately 110° angle to said laser output axis.

34. The optical encoder of claim 33 further including
   d) combining means disposed at said point of incidence at said fourth side for recombining said first and second diffracted beams to provide two interfering overlapped beams (of first order) having a predetermined interference fringe separation.

35. The optical encoder of claim 34 further including
   e) a base frame of heat conducting material for mounting and supporting some optical encoder elements in the same plane on a first side of said base frame.

36. The optical encoder of claim 35 further including
   f) a heat sink of heat conducting material disposed in spaced relationship with a second opposite side of said base frame for acting as a heat repository.

37. The optical encoder of claim 36 further including
   g) heat pump means disposed between said base frame and said heat sink for actively transferring heat in and out of said base frame said heat sink to provide for stabilizing both the laser source and the entire base frame of the encoder from thermal effects, whatever their origin.

* * * * *